(12) United States Patent
Raffaelli

(10) Patent No.: US 12,397,875 B2
(45) Date of Patent: *Aug. 26, 2025

(54) MOTOR VEHICLE WITH A SUSPENSION USING A TCHEBICHEFF FOUR-BAR LINKAGE

(71) Applicant: PIAGGIO & C. S.P.A., Pontedera (IT)

(72) Inventor: Andrea Raffaelli, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 785 days.

This patent is subject to a terminal disclaimer.

(21) Appl. No.: 17/641,299

(22) PCT Filed: Sep. 4, 2020

(86) PCT No.: PCT/IB2020/058235
§ 371 (c)(1),
(2) Date: Mar. 8, 2022

(87) PCT Pub. No.: WO2021/048716
PCT Pub. Date: Mar. 18, 2021

(65) Prior Publication Data
US 2022/0281551 A1 Sep. 8, 2022

(30) Foreign Application Priority Data
Sep. 9, 2019 (IT) .......................... 102019000015908

(51) Int. Cl.
*B62K 25/24* (2006.01)
*B60G 3/20* (2006.01)
(Continued)

(52) U.S. Cl.
CPC .............. *B62K 25/24* (2013.01); *B60G 3/207* (2013.01); *B62K 5/08* (2013.01); *B62K 5/10* (2013.01);
(Continued)

(58) Field of Classification Search
CPC . B62K 25/24; B62K 5/08; B62K 5/10; B62K 21/02; B62K 2005/001;
(Continued)

(56) References Cited

U.S. PATENT DOCUMENTS

| | | | |
|---|---|---|---|
| 8,109,523 B2 * | 2/2012 | Kolesar | .................. B62B 13/04 280/14.28 |
| 2003/0102176 A1 * | 6/2003 | Bautista | ................. B62K 5/027 280/124.103 |

(Continued)

FOREIGN PATENT DOCUMENTS

| | | |
|---|---|---|
| EP | 2595868 A1 | 5/2013 |
| EP | 2595868 B1 | 7/2015 |

*Primary Examiner* — Valentin Neacsu
*Assistant Examiner* — Marlon A Arce
(74) *Attorney, Agent, or Firm* — McGlew and Tuttle, P.C.

(57) ABSTRACT

The saddle-riding motor vehicle (1; 107; 207) comprises a rear driving wheel (5; 105; 205) and a front steered wheel (7; 107; 207). The front steered wheel (7; 107; 207X, 207Y) is connected to a rotatable arm (9; 109; 209X, 209Y) provided with a rotary motion about a steering axis (A-A). A wheel support (37; 137) is connected to the rotatable arm (9; 109; 209) with the interposition of a suspension (17; 117; 217X, 217Y) comprising a shock absorber (22; 122). The suspension (17; 117) comprises a Tchebycheff four-bar linkage.

16 Claims, 17 Drawing Sheets

(51) Int. Cl.
  *B62K 5/08* (2006.01)
  *B62K 5/10* (2013.01)
  *B62K 21/02* (2006.01)
  *B62K 5/00* (2013.01)

(52) U.S. Cl.
  CPC .......... *B62K 21/02* (2013.01); *B60G 2200/44* (2013.01); *B60G 2204/422* (2013.01); *B60G 2300/122* (2013.01); *B62K 2005/001* (2013.01)

(58) Field of Classification Search
  CPC .. B62K 25/005; B60G 3/207; B60G 2200/44; B60G 2204/422; B60G 2300/122; B60G 2200/13; B60G 2200/143; B60G 2204/12; B60G 15/067; B60G 2204/421; B60G 2300/12
  See application file for complete search history.

(56) References Cited

U.S. PATENT DOCUMENTS

| | | | |
|---|---|---|---|
| 2008/0202827 A1* | 8/2008 | Thiers | B62K 21/005 180/6.24 |
| 2009/0218778 A1* | 9/2009 | Chen | B62K 25/24 280/124.13 |
| 2011/0012321 A1* | 1/2011 | Chen | B60G 3/00 280/124.13 |
| 2018/0281888 A1* | 10/2018 | Chang | B62K 21/04 |
| 2020/0017158 A1* | 1/2020 | Hara | B62K 5/08 |
| 2021/0394857 A1* | 12/2021 | Raffaelli | B62K 5/10 |
| 2022/0339984 A1* | 10/2022 | Starik | B60G 3/20 |
| 2024/0010295 A1* | 1/2024 | Raffaelli | B62K 25/24 |
| 2024/0043086 A1* | 2/2024 | Raffaelli | B62K 5/10 |

\* cited by examiner

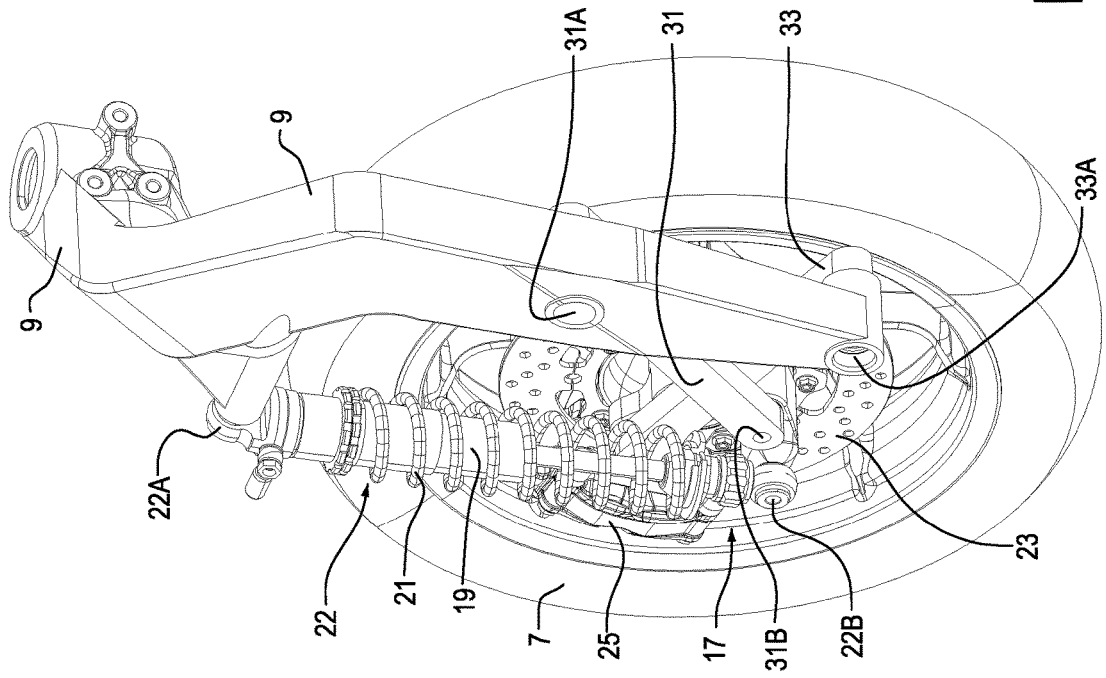
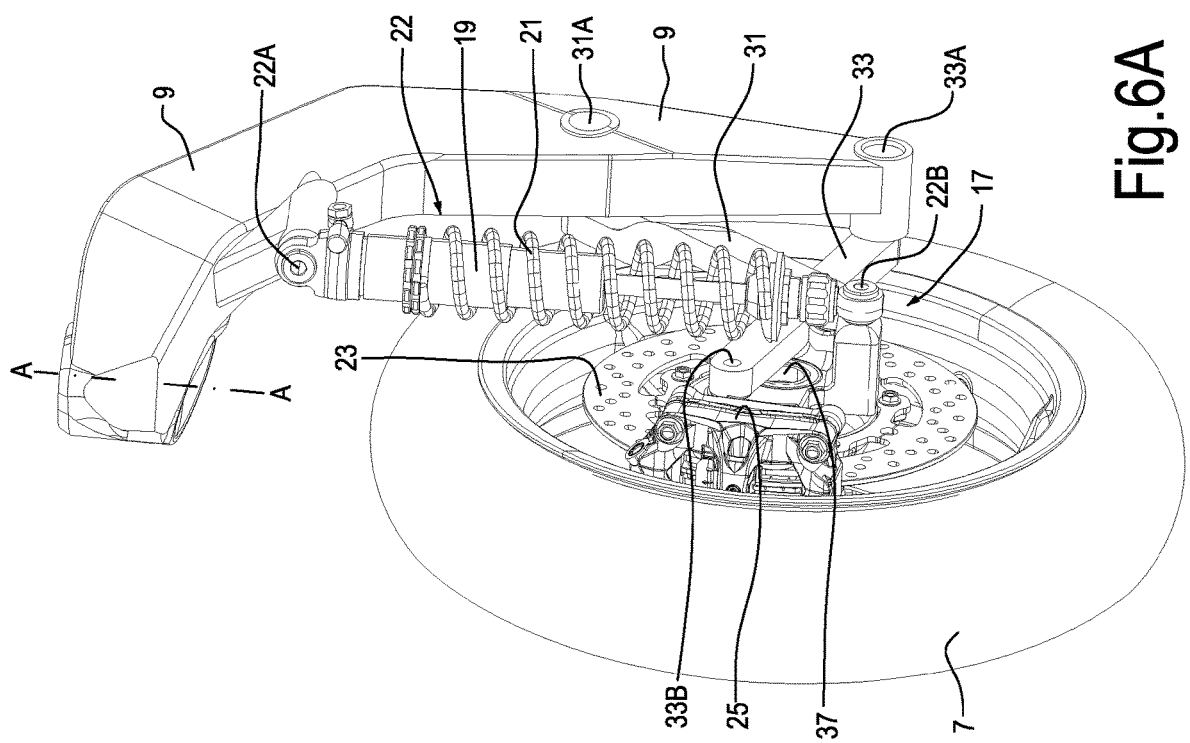
Fig.6A
Fig.6B

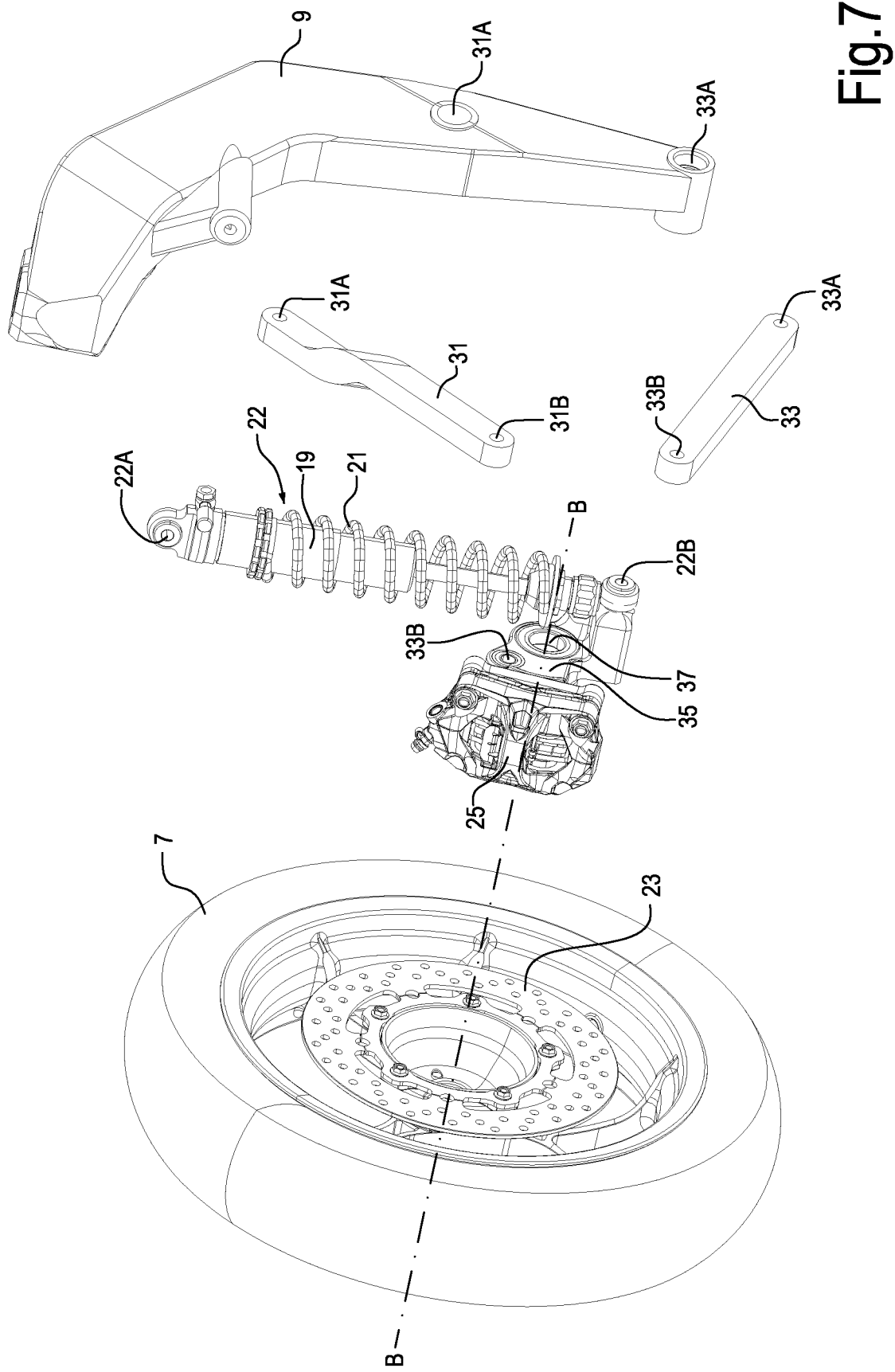

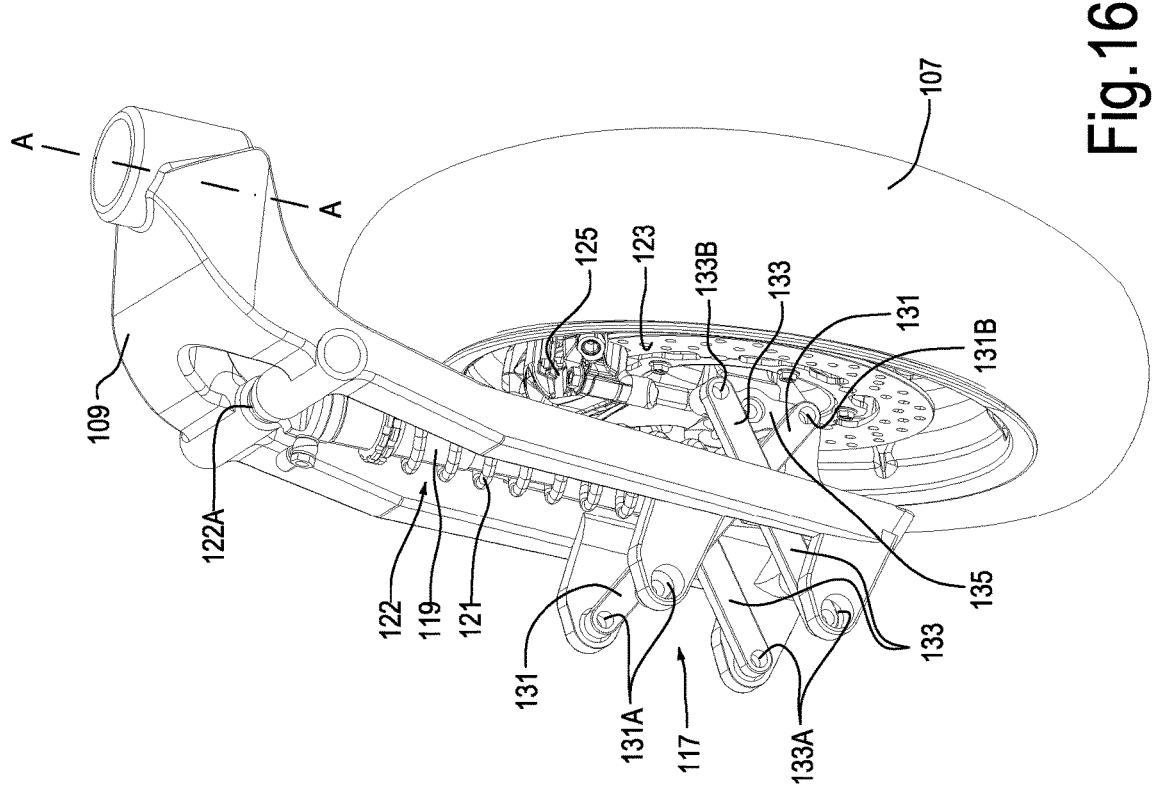
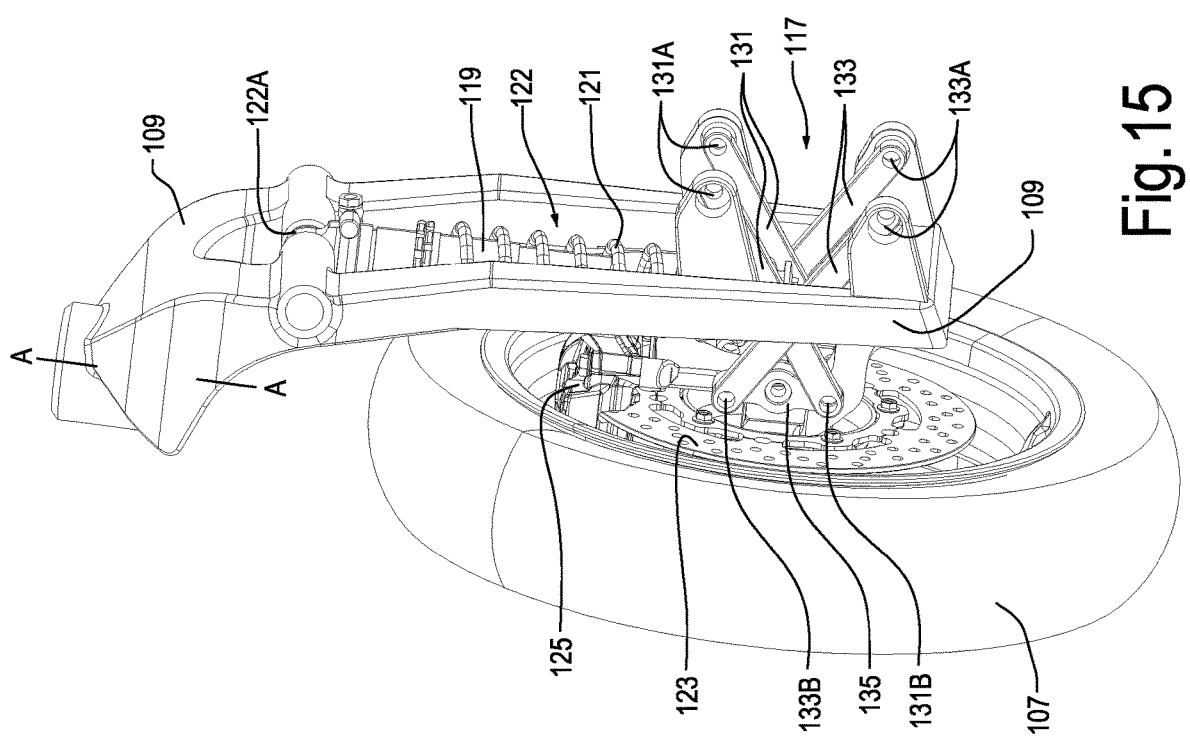

MOTOR VEHICLE WITH A SUSPENSION USING A TCHEBICHEFF FOUR-BAR LINKAGE

TECHNICAL FIELD

The invention relates to improvements to two, three or four wheel saddle-riding vehicles. More specifically, the invention relates to improvements to the front suspension of a tilting type saddle motor vehicle, with one or two rear driving wheels and one or two front steered wheels, such as for example two or three wheel motorcycles, two or three wheel scooters, QUAD or the like.

BACKGROUND ART

Two, three or four-wheel saddle-riding vehicles typically have one or two rear driving wheels, connected to the frame of the motor vehicle through their own rear suspension, and one or two front steered wheels, connected to a handlebar and provided with respective front suspensions. The suspensions connect the so-called sprung mass to the so-called unsprung mass of the motor vehicle and allow relative movement between sprung and unsprung mass. The suspensions are usually shock-absorbing suspensions, and comprise a respective shock absorber, in turn comprising an elastic member, typically a spring, and a brake or damper. The suspensions also include mechanical members that connect the sprung mass to the unsprung mass with the possibility of relative movement between them, so that the shocks transmitted by the roughness or irregularity of the ground to the wheels are not transmitted, or are transmitted in a damped manner, to the vehicle chassis.

In saddle-riding vehicles, such as motorcycles, scooters, QUAD or the like, the suspension of the front steered wheels allow relative movement between the handlebar and the steering column on one side and the front steered wheel or wheels on the other. Some suspensions of the front steered wheels of saddle-riding vehicles use telescopic forks with members sliding one inside the other to allow the aforesaid relative movement. The telescopic forks use cylindrical pairs, which have members in mutual sliding relationship; these forks therefore have some typical drawbacks of this type of relative motion. Other types of suspensions, on the other hand, use revolute pairs, which have members in mutual rotation relationship. In this case, four-bar linkage, typically a four-bar linkage, is interposed between the sprung mass and the unsprung mass, which deforms to allow the suspension movement between the sprung mass (vehicle chassis and members connected thereto) and the unsprung mass (wheel, brakes). The revolute pairs are represented by the hinges that join the components of the four-bar linkage to one another.

Suspensions that use kinematic mechanisms with revolute pairs for the connection between sprung mass and unsprung mass have the advantages of revolute pairs with respect to prismatic and cylindrical pairs, but do not allow a straight movement of the front steered wheel axis. In the suspension movement, in fact, when the suspension contracts and extends due to, for example, an uneven ground, or during braking due to the dynamic forces generated on the frame and which are discharged onto the wheels through the suspension, the wheel axle performs a non-rectilinear movement with consequent transverse sliding movement of the wheel on the ground, which can trigger, for example, problems of skipping.

It would therefore be beneficial to provide a suspension for front steered wheels of saddle-riding motor vehicles, with two or more wheels, which allows combining the advantages of a telescopic fork suspension, with the advantages of suspensions using revolute pair kinematic mechanisms.

SUMMARY OF THE INVENTION

According to one aspect, a saddle-riding motor vehicle is disclosed herein with at least one rear driving wheel and at least a first front steered wheel, which is connected to a rotatable arm provided with a rotary motion about a steering axis. A wheel support is connected to the rotatable arm with the interposition of a suspension which connects the wheel support and the wheel mounted thereon to the rotatable arm. The suspension includes a shock absorber. The wheel support supports the front steered wheel and defines a rotation axis of said wheel. For example, a wheel mounting axle may be fixed to the wheel support, or the wheel support may have a bearing supporting a wheel axle. Characteristically, the suspension comprises a Tchebicheff four-bar linkage (also called Chebychevn four-bar linkage, or Tchebycheff or Chebychev mechanism).

In practical embodiments, the Tchebycheff four-bar linkage comprises a first crank hinged with a first hinge to the rotatable arm and with a second hinge to a connecting rod of the Tchebicheff four-bar linkage. A second crank is hinged with a first hinge on the rotatable arm and with a second hinge on the connecting rod. The wheel support is constrained in a constraining point of the connecting rod such that the rotation axis of the front steered wheel is approximately equidistant from the second hinge of the first crank and from the second hinge of the second crank.

In practical embodiments, the first crank and the second crank cross in any position of the suspension, i.e. they remain crossed with each other for all the positions that the suspension can take during normal use of the motor vehicle.

In some embodiments, the wheel support is constrained to the connecting rod so that the rotation axis of the front steered wheel is parallel to the axes of the first hinge and of the second hinge of the first crank and of the second crank. In this case, the axes of the hinges of the Tchebicheff four-bar linkage are practically oriented in a right-left orientation with respect to the motor vehicle.

In the embodiments described herein, the wheel support is rigidly connected to the connecting rod and forms a seat for a support bearing of the front steered wheel. The seat may be a seat in which the bearing is inserted, which in turn receives an axle integral with the wheel. Conversely, the seat may be formed by an axle rigidly integral with the wheel support, on which a bearing is keyed which in turn supports the wheel.

In other embodiments, the axes of the hinges of the Tchebicheff four-bar linkage may be parallel to each other and orthogonal to a plane containing the rotation axis of the front steered wheel. In this case, the axes of the hinges of the Tchebicheff four-bar linkage are essentially parallel to a plane extending in the forward-rear direction of the motor vehicle.

In some configurations, the wheel support is hinged to the connecting rod of the Tchebicheff four-bar linkage according to an axis substantially parallel to the axes of the hinges of the Tchebicheff four-bar linkage.

The wheel support may support the front steered wheel in a position such that the rotation axis of the front steered wheel is orthogonal to the axis around which the wheel support is hinged to the connecting rod of the Tchebicheff four-bar linkage.

In some embodiments, the first hinges of the first crank and of the second crank are placed on one side of the rotatable arm, and the second hinges of the first crank and of the second crank are placed on a second side of the rotatable arm, opposite the first side. The connecting rod is located on said second side. Preferably, the front steered wheel is located on the second side of the rotatable arm and the connecting rod is preferably positioned between the front steered wheel and the rotatable arm.

The shock absorber of the suspension is generally connected between two points of the suspension which move relative to each other during the suspension movement, thereby causing the shock absorber to lengthen and shorten. In practical embodiments, the shock absorber is connected on one side to the rotatable arm and on the other to a point rigidly connected to the wheel support, or to one of the remaining elements of the Tchebicheff four-bar linkage, i.e. the first crank, the second crank or the connecting rod.

According to another aspect, a saddle-riding motor vehicle is provided with at least one rear driving wheel and at least a first front steered wheel, which is connected by means of a suspension to a rotatable arm provided with a rotary motion about a steering axis, wherein:
- a wheel support is connected to the rotatable arm with the interposition of the suspension, which supports the front steered wheel and defines the rotation axis of said wheel;
- the suspension comprises: a four-bar linkage having: a first crank with a first end hinged to the rotatable arm and a second end hinged to a connecting rod; a second crank with a first end hinged to the rotatable arm and a second end hinged to the connecting rod;
- the wheel support is constrained to a connecting rod constraining point; and
- the four-bar linkage is configured in such a way that during the deformation of the four-bar linkage by effect of the suspension movement of the suspension, the constraining point performs an approximately rectilinear trajectory.

BRIEF DESCRIPTION OF THE DRAWINGS

The invention will be better understood by following the description and the accompanying drawings, which illustrate exemplifying and non-limiting embodiments of the invention. More particularly, in the drawing:

FIGS. 6A and 6B show axonometric views of the suspension of FIGS. 4A, 4B and 5;

FIG. 7 shows an exploded view of the suspension of FIGS. 4A, 4B, 5, 6A and 6B;

FIGS. 15 and 16 show axonometric views of the suspension of FIGS. 13 and 14;

DETAILED DESCRIPTION OF EMBODIMENTS

FIGS. 1, 2, 3, 4A, 4B, 5, 6, 7 and 7A illustrate a two-wheel motor vehicle with a Tchebycheff four-bar linkage suspension, or Tchebycheff mechanism, in a first embodiment thereof.

Figure 1:
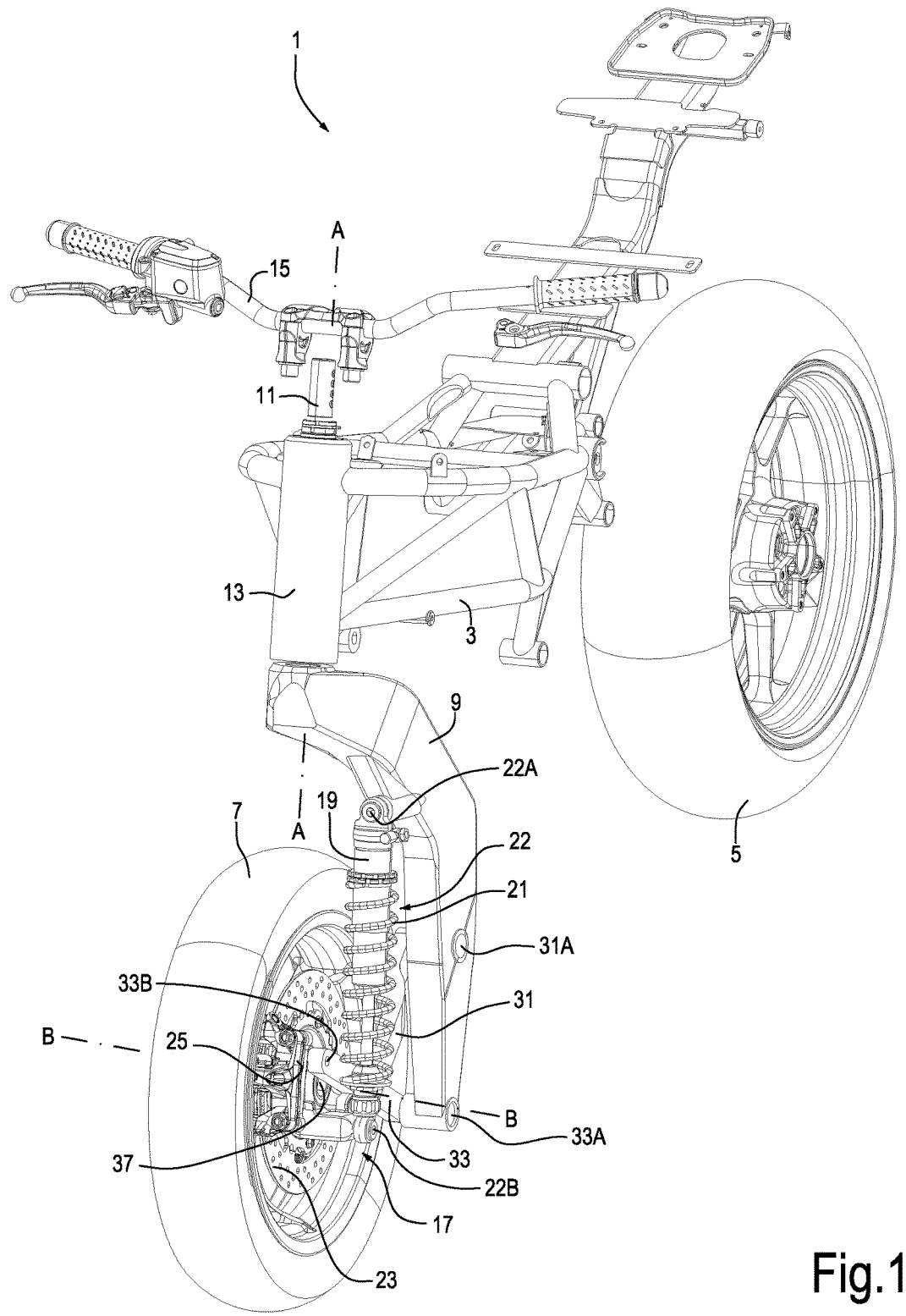
FIG. 1 shows an axonometric view with parts removed of a two-wheel motor vehicle with a front suspension according to an embodiment.
Figure 2:
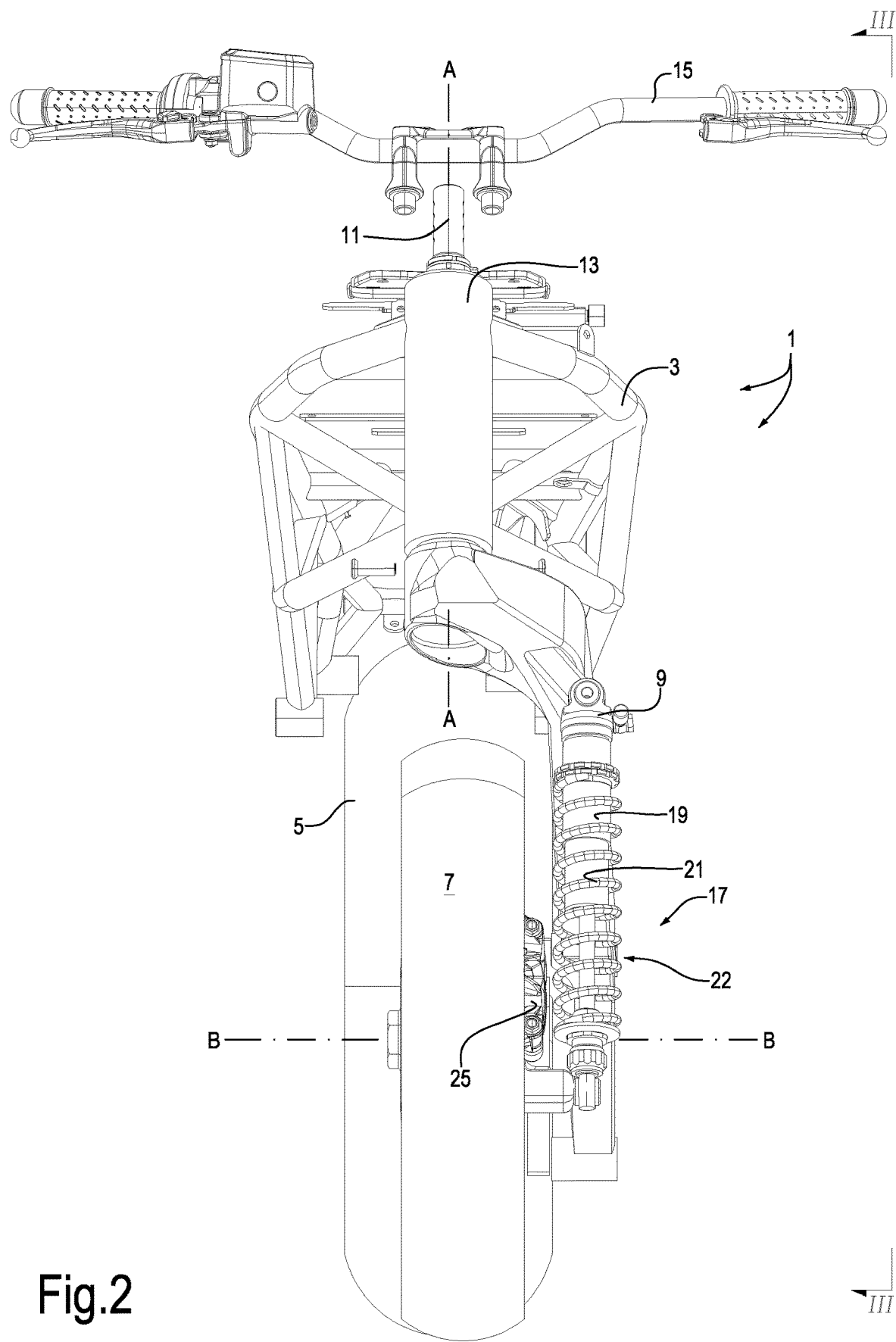
FIG. 2 shows a front view of the motor vehicle of FIG. 1.
Figure 3:
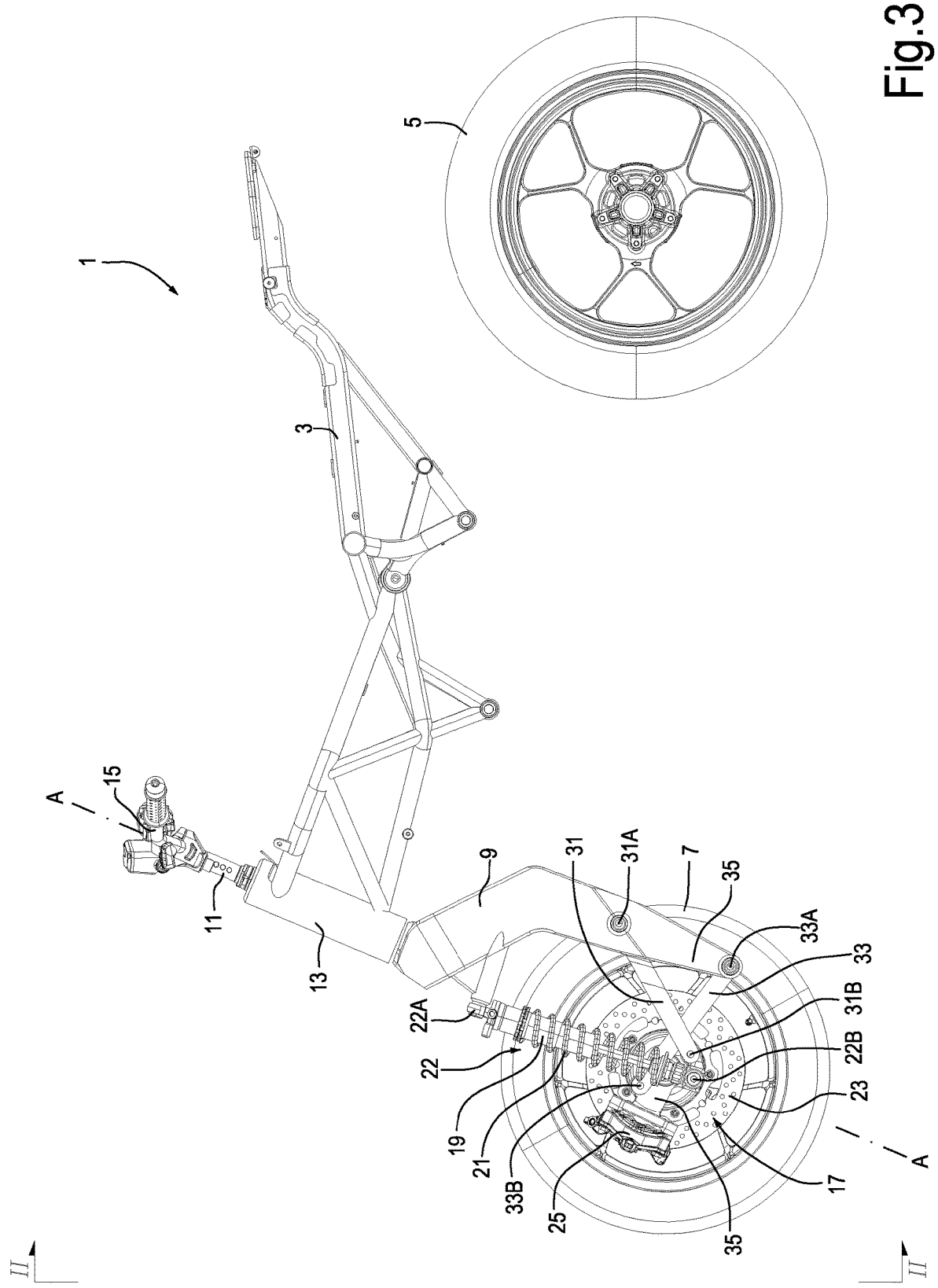
FIG. 3 shows a side view according to III-III of FIG. 2.
Figure 4:
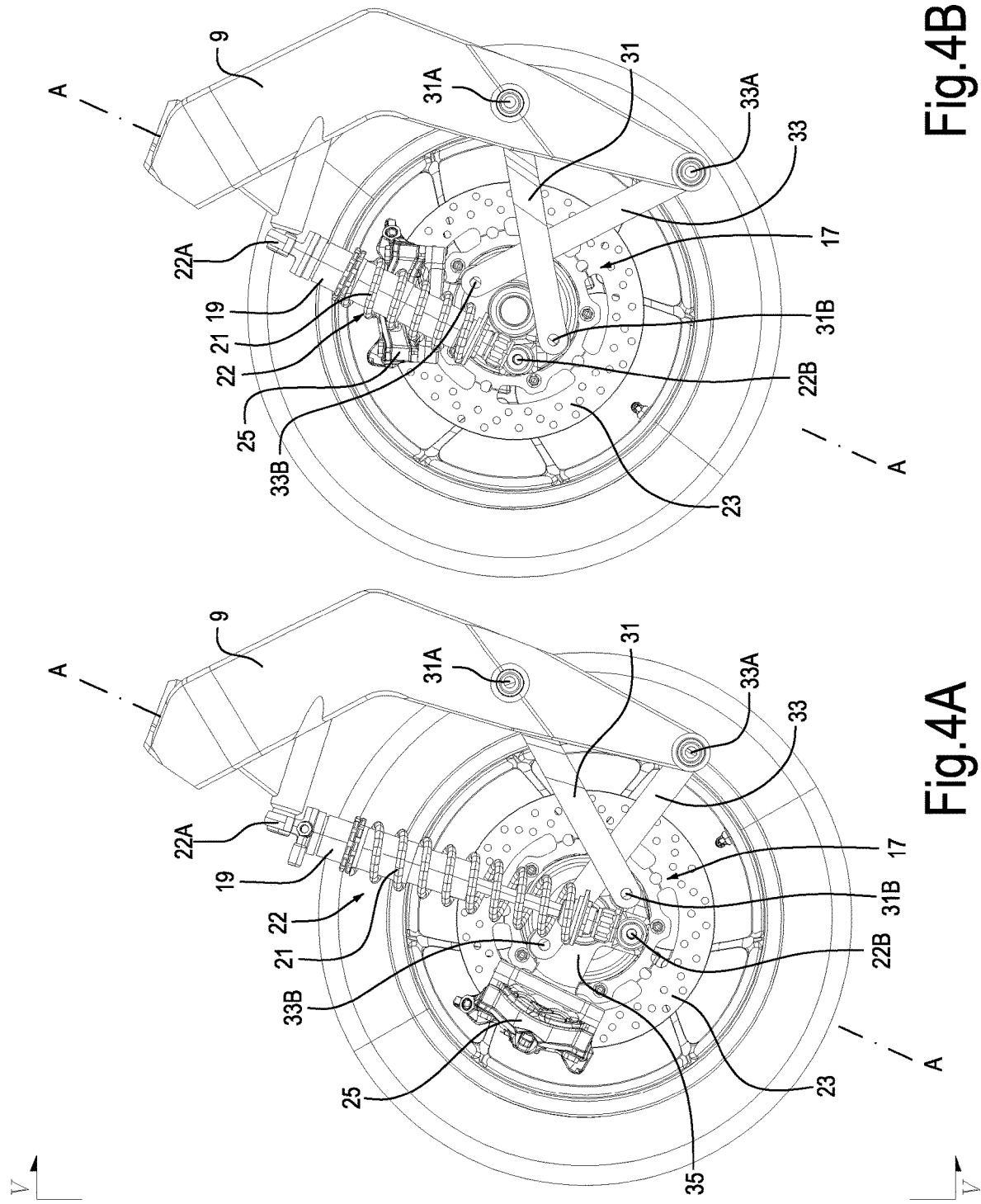
FIGS. 4A and 4B show an enlarged side view of the suspension of FIGS. 1 to 3 in an extended position and in a contracted position, respectively.
Figure 5:
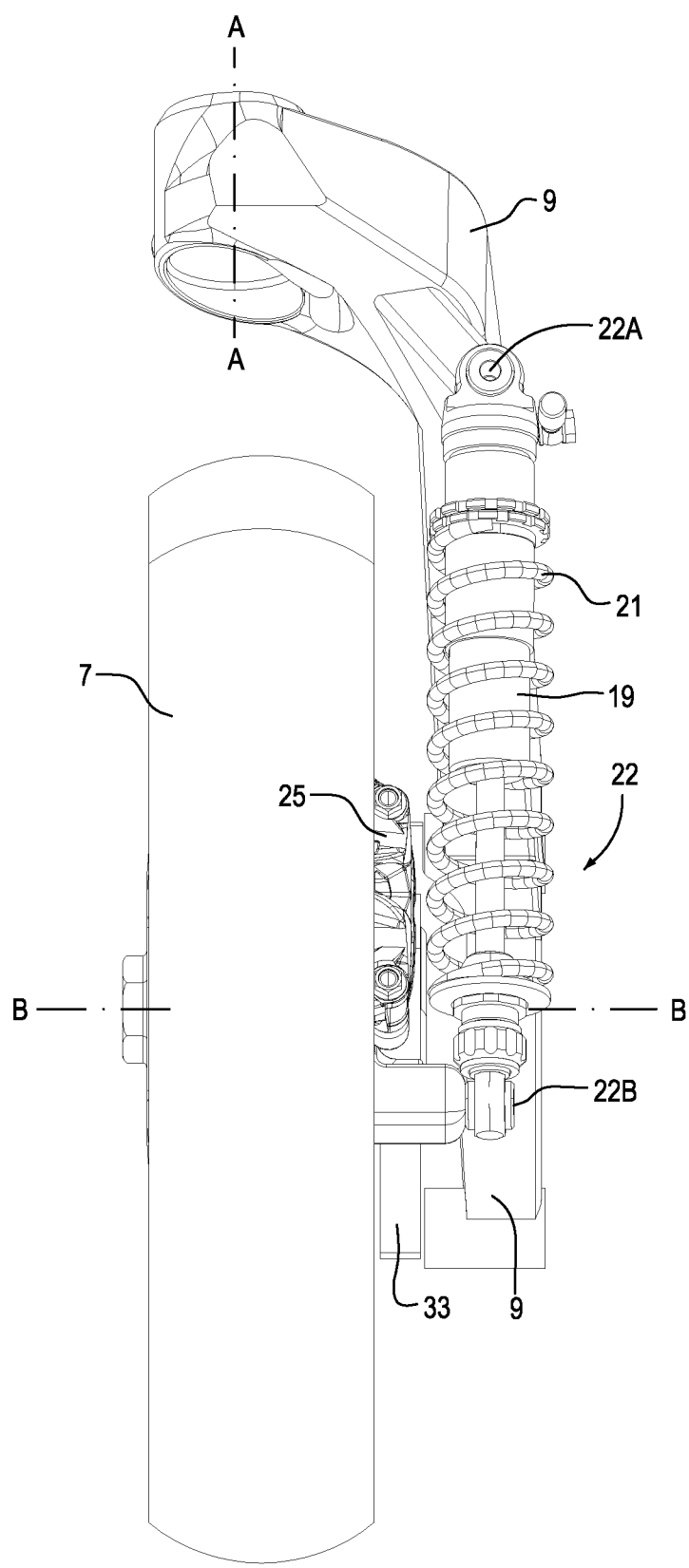
FIG. 5 shows a front view according to the line V-V of FIG. 4A.

The motor vehicle 1 is briefly illustrated in FIGS. 1, 2 and 3. In these views, parts of the motor vehicle, not necessary for understanding the structure and operation of the suspension, are removed or omitted. The motor vehicle 1 comprises a frame 3, a rear driving wheel 5 and a front steered wheel 7. The wheels 5 and 7 are connected to the frame 3 by means of suspensions. The rear suspension, which connects the driving wheel 5 to the frame, is not illustrated and may be configured in any known manner. The front suspension, which connects the front steered wheel 7 to the frame 3, will be described in detail below.

The front steered wheel 7 is connected to a rotatable arm 9. The latter is rigidly connected to a steering column 11 rotatably housed in a steering tube 13 and operable by means of a handlebar 15 to rotate around a steering axis A-A. The rotation of the rotatable arm 9 about the axis A-A allows steering the vehicle 1.

The front steered wheel 7 is connected to the rotatable arm 9 by means of a suspension globally indicated with 17, which allows the suspension movement of the frame 3, including the steering tube 13, as well as the steering column 11, the handlebar 15 and the rotatable arm 9 with respect to the front steered wheel 7. The suspension 17 is a shock absorbing suspension, comprising: a linkage mechanism between the front steered wheel 7 and the rotatable arm 9; and a shock absorber. The latter in turn comprises an elastic element and a brake or damper. In the illustrated embodiment, the shock absorber is indicated with 22, the elastic element with 21 and the brake or damper with 19. The latter is housed coaxially inside the elastic element 21, in the form of a helical spring.

The front steered wheel 7 is supported by the suspension 17 so as to rotate about its own rotation axis B-B.

Reference numeral 23 indicates a disk of a front brake of the motor vehicle 1. The brake further comprises a caliper 25 which may be supported by the suspension 17 in the manner described below.

The suspension 17 comprises components connected to each other by means of revolute pairs, i.e. components that move relative to each other according to a single degree of freedom, represented by a rotation movement about a respective hinge axis.

Advantageously, the kinematic system with revolute pairs which connects the front steered wheel 7 to the rotatable arm 9 comprises a so-called Tchebycheff four-bar linkage, or Tchebycheff mechanism. The latter comprises, in addition to the rotatable arm 9, a first crank 31 and a second crank 33. The two cranks 31 and 33 are hinged to the rotatable arm 9 and to a connecting rod 35, which is also part of the Tchebycheff four-bar linkage, or Tchebycheff mechanism. The first crank 31 and the second crank 33 cross at an intermediate point between the respective ends where the hinges for connection to the rotatable arm 9 and to the connecting rod 37 are arranged. The configuration of the Tchebycheff four-bar linkage inserted in the suspension 17 is such that the two cranks 31, 33 remain in a crossed position in any of the various positions that the suspension 17 can take while driving, i.e. from the position of maximum extension to the position of maximum contraction of the suspension 17.

More specifically, the first crank 31 is hinged via a first hinge 31A to the rotatable arm 9 and through a second hinge 31B to the connecting rod 35. In turn, the second crank 33 is hinged through a first hinge 33A to the rotatable arm 9 and through a second hinge 33B to the connecting rod 35. The hinges 31A, 31B, 33A, 33B represent the revolute pairs of the Tchebycheff four-bar linkage.

The cranks 31 and 33 are of approximately equal length and shorter than the connecting rod 35. The length of the components 31, 33, 35 is intended as the distance between the axes of the respective hinges. Therefore, for example, the length of the first crank 31 is given by the distance between the axes of the hinges 31A and 31B, the length of the second crank 33 is given by the distance between the axes of the hinges 33A and 33B, and the length of the connecting rod 35 is given by the distance between the axes of the hinges 31B and 33B.

More specifically, the ratio between the length of each crank, the distance between the hinges 31A, 33A and the distance between the hinges 31B, 33B is equal to 5:4:2.

A wheel support indicated with 37 is constrained to a constraining point of the connecting rod 35, which is substantially equidistant between the axes of the hinges 31B and 33B, see in particular FIG. 7. In practice, the wheel support 37 defines the rotation axis B-B of the wheel and keeps said axis in an intermediate position between the axes of the hinges 31B and 33B and orthogonal to the connecting rod 35. In the embodiment of FIGS. 1 to 7, the caliper 25 of the disc brake 23, 25 is rigidly fixed to the wheel support 37, as can be seen in particular in the exploded view of FIG. 7. In the illustrated embodiment, the wheel support 37 consists in practice of the seat of a bearing supporting the rotation axle of the front steered wheel 7.

In the embodiment of FIGS. 1 to 7, the shock absorber 22 is also hinged to the connecting rod 35. More particularly, the shock absorber 22 is hinged at one end in 22A to the rotatable arm 9 and at one end 22B to the connecting rod 35. The constraints between the shock absorber 22 and the rotatable arm 9 on one side and the connecting rod 35 on the other may consist of spherical hinges.

As can be easily understood from FIGS. 4A, 4B, which show an extended position and a contracted position of the suspension 17 and the shock absorber 22, the suspension movement of the front steered wheel 7 is allowed by a deformation movement of the Tchebycheff four-bar linkage and more particularly by a pivoting movement of the cranks 31, 33 about the axes 31A, 33A, through which the cranks are hinged to the rotatable arm 9. Such a pivoting movement corresponds to a roto-translation movement of the connecting rod 35 and to a compression/extension of the shock absorber 22. The configuration of the Tchebycheff four-bar linkage is such that in both positions of FIGS. 4A, 4B and in any intermediate position between them, the two cranks 31 and 33 cross each other. In this range of the pivoting movement of the cranks, the trajectory of the mid-point of the connecting rod 37 is approximately rectilinear and consequently the trajectory of the rotation axis B-B of the front steered wheel 7 is approximately rectilinear.

Due to the properties of the Tchebycheff four-bar linkage, at least within a certain angle of oscillation of the cranks 31, 33 the centre of the connecting rod 35, which lies on the rotation axis B-B of the front steered wheel 7, moves along a substantially rectilinear trajectory. The elements forming the Tchebycheff four-bar linkage are mounted in such a way that the trajectory of the rotation axis B-B of the front steered wheel 7 is approximately rectilinear for the entire stroke from the position of maximum extension to the position of maximum contraction of the suspension 17.

Figure 7A:
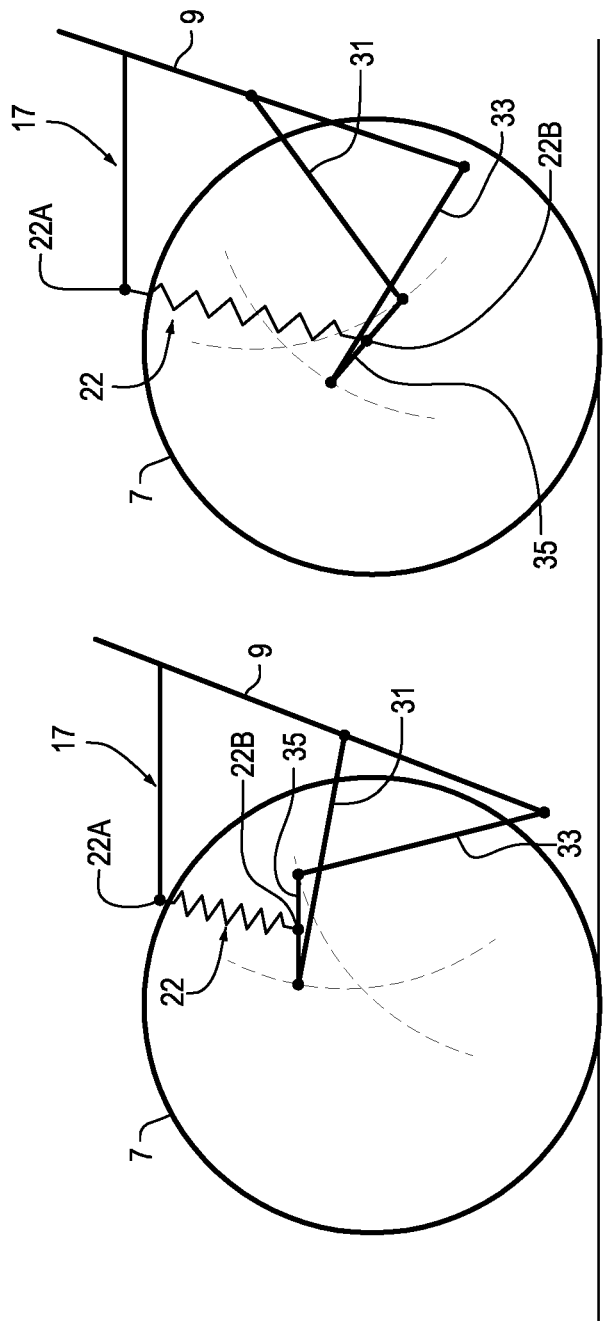
FIG. 7A shows a schematic representation of the suspension of FIGS. 4 to 7 in two different positions, of maximum compression and maximum extension of the shock absorber, respectively.
Figure 9:
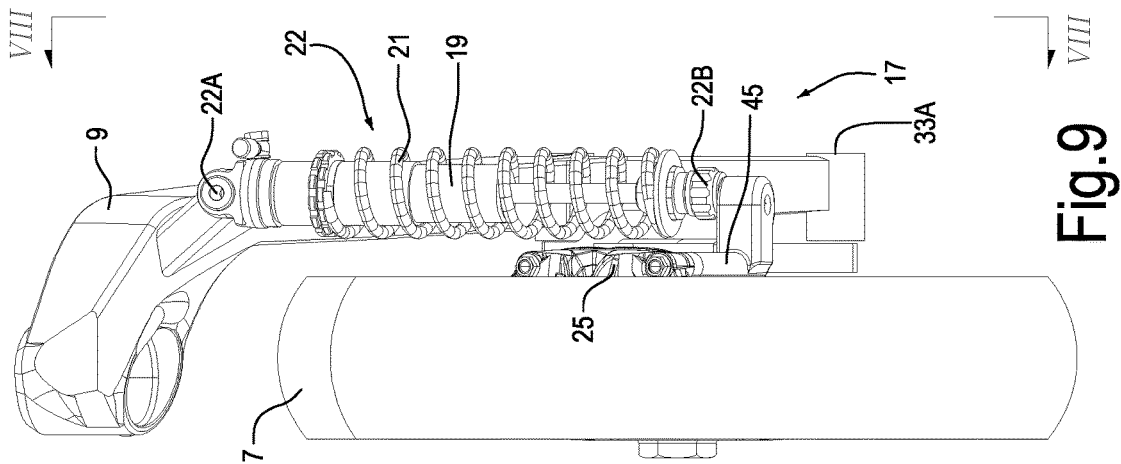
FIG. 9 shows a front view according to IX-IX of FIG. 8.
Figure 8:
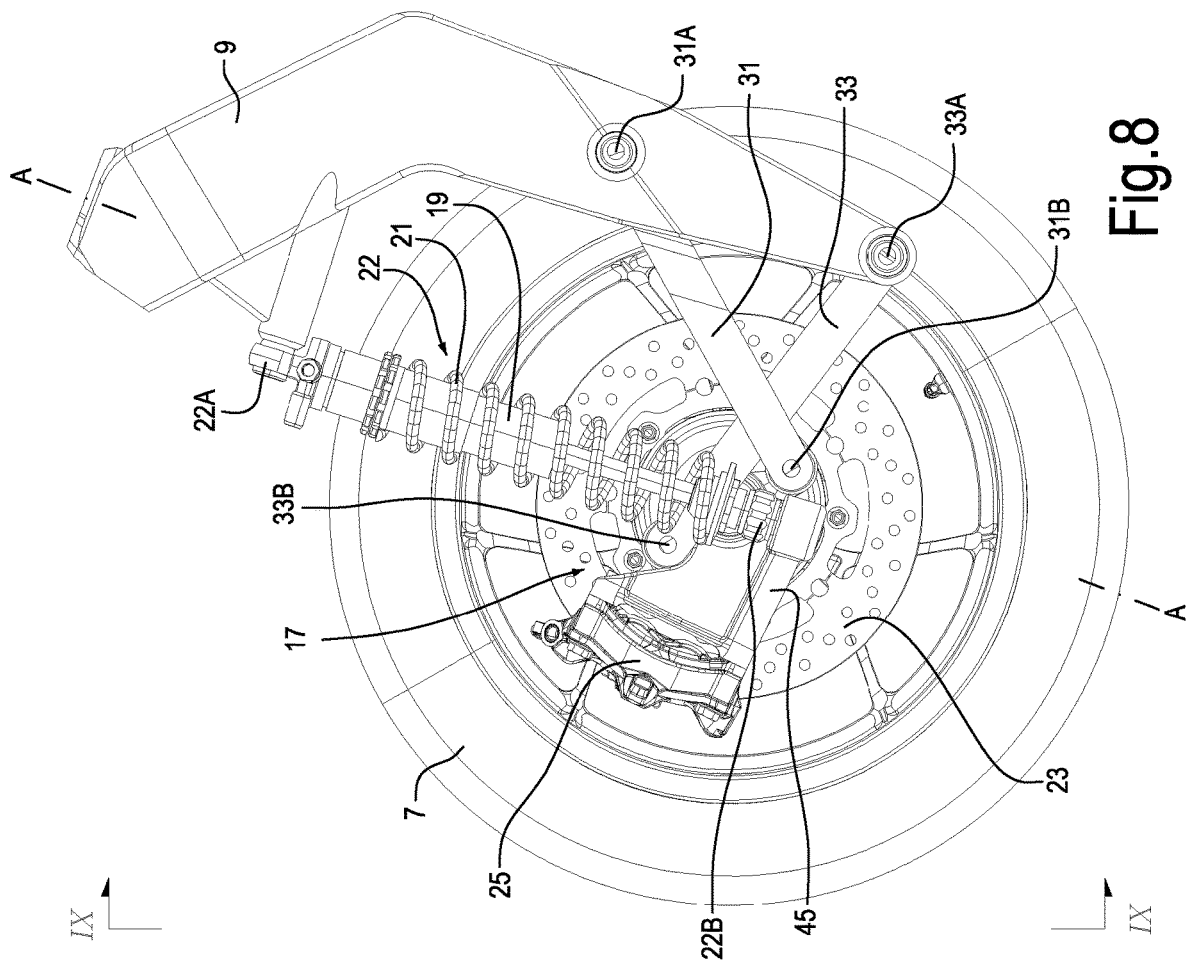
FIG. 8 shows a side view of a suspension in a further embodiment according to the line VIII-VIII of FIG. 9.
Figure 11:
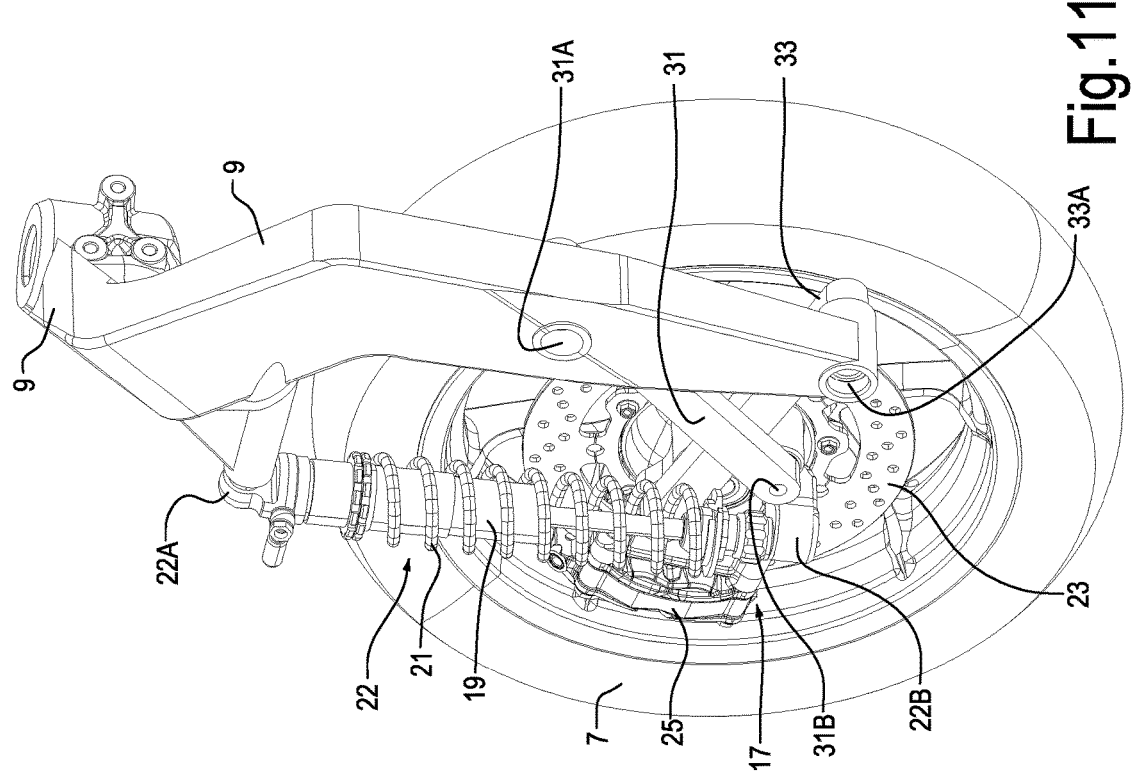
FIGS. 10 and 11 show axonometric views of the suspension of FIGS. 8 and 9.
Figure 10:
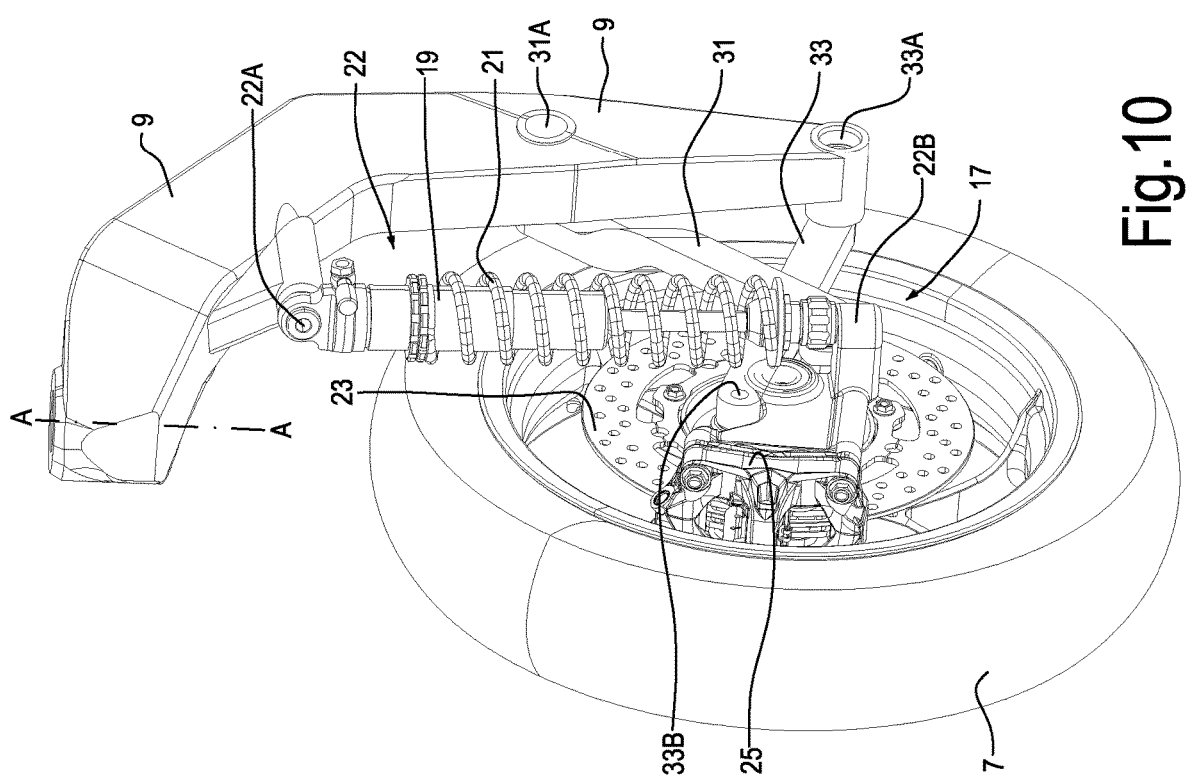

The operation of the suspension described so far is easily understood from the diagram of FIG. 7A, where the components thereof are represented schematically and indicated with the same reference numerals. This figure shows: the position of maximum compression of the shock absorber 22 (position a) and the position of maximum extension of the shock absorber 22 (position b).

In the present context, the term "about rectilinear", "substantially rectilinear" or "approximately rectilinear" means a trajectory which deviates from a perfectly rectilinear trajectory by an extent of less than 2 mm and preferably less than 1 mm in the range of use of the suspension, i.e. in any position assumed by the Tchebycheff four-bar linkage during normal use of the motor vehicle.

The embodiment described with reference to FIGS. 1 to 7 may be susceptible of multiple variations, some of which are described below with reference to the following figures. Furthermore, the shock absorber 22 may be connected to different elements with respect to the arm 9 and the connecting rod 37. In general, the shock absorber 22 is connected, with the ends 22A, 22B, to two points of the suspension 17 which move relative to each other during the suspension movement of the suspension 17.

As previously described, and as shown in particular in FIG. 7, the caliper 25 of the disc brake 23, 25 may be rigidly constrained to the connecting rod 35. In this case, the caliper 25 rotates integrally with the connecting rod 35 about the rotation axis B-B of the front steered wheel 7. This may have a non-negligible pro-dive or anti-dive effect, due to the fact that the instant rotation center of the connecting rod 35 is located close to the point of contact of the front steered wheel 7 with the ground. This instant rotation center is defined by the intersection of the extension of the two rectilinear segments, which connect the hinges 31A, 31B and 33A, 33B, respectively. This pro-dive or anti-dive effect may be undesirable.

In order to avoid or reduce the pro-dive or anti-dive effect of the suspension during braking, in some embodiments the caliper 25 can be rigidly connected to a member which is mounted coaxial to the front steered wheel 7, and therefore to the connecting rod 35, but not integral with the latter, and whose instant rotation center is more distant.

Figure 12:
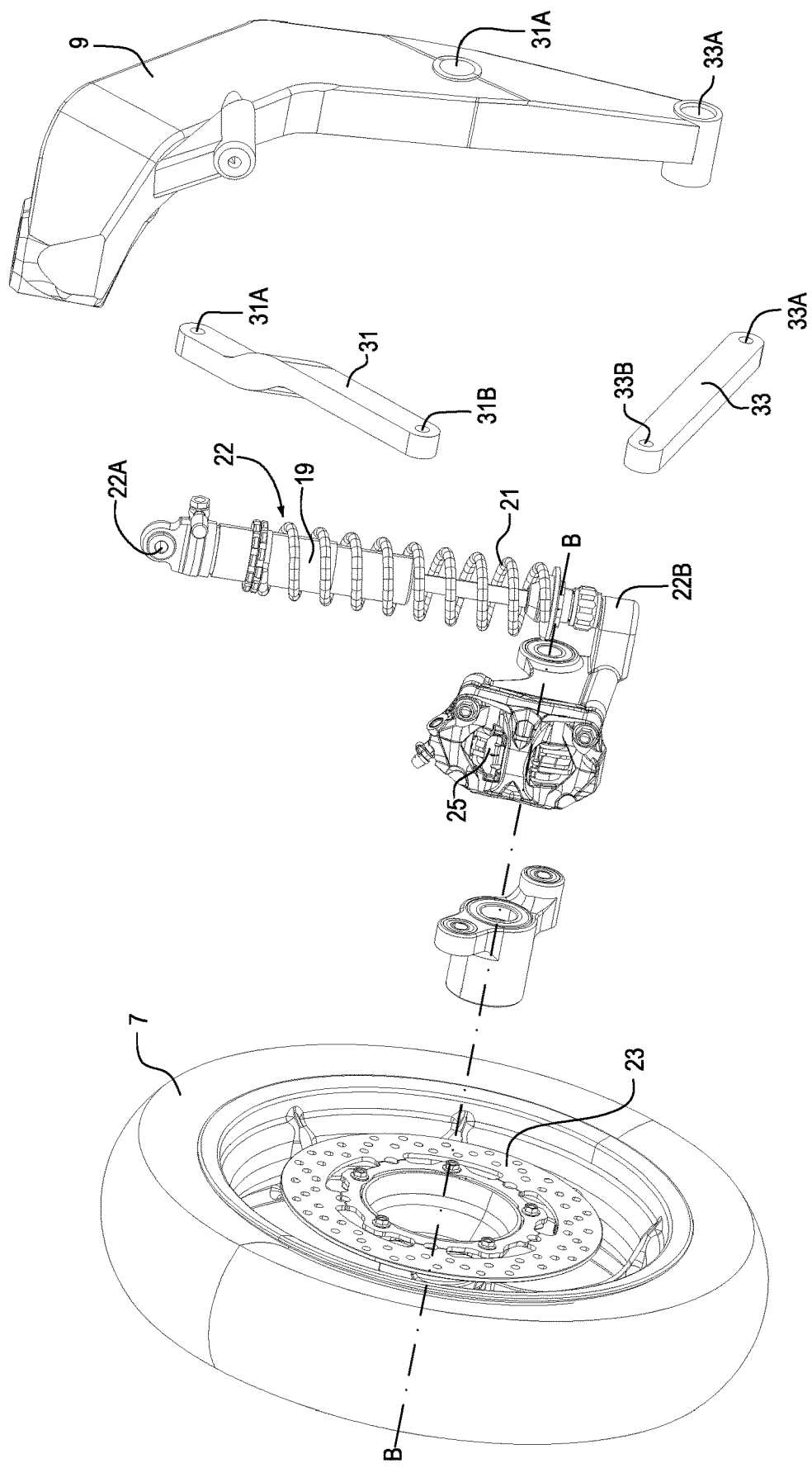
FIG. 12 shows an exploded view of the suspension of FIGS. 9, 10 and 11.
Figure 14:
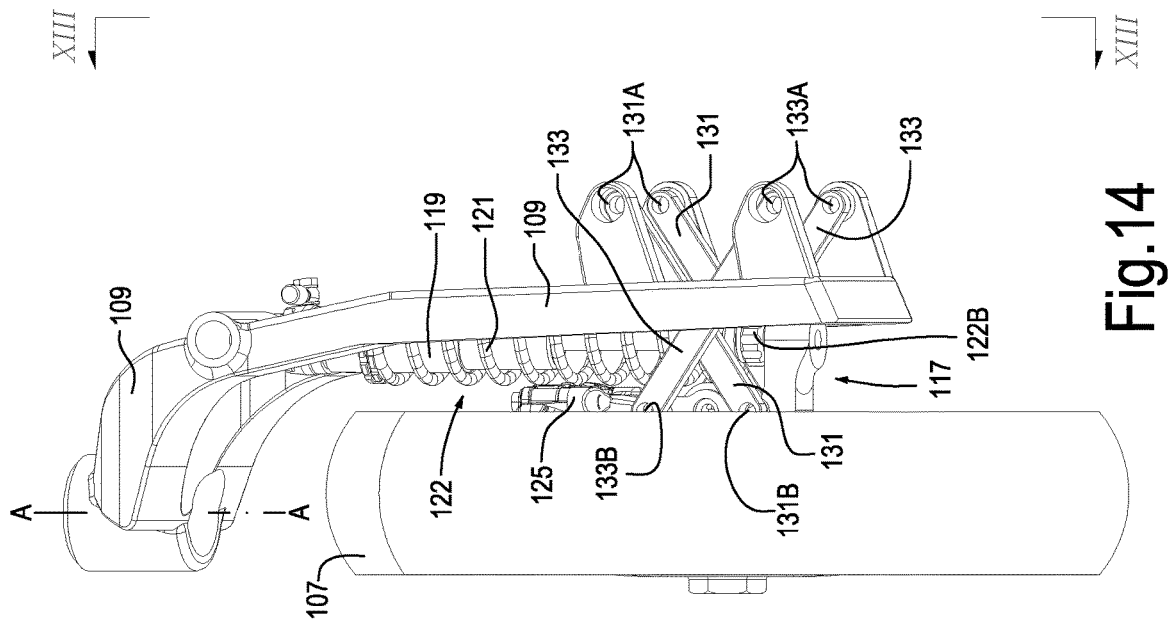
FIG. 14 shows a front view according to XIV-XIV of FIG. 13.
Figure 13:
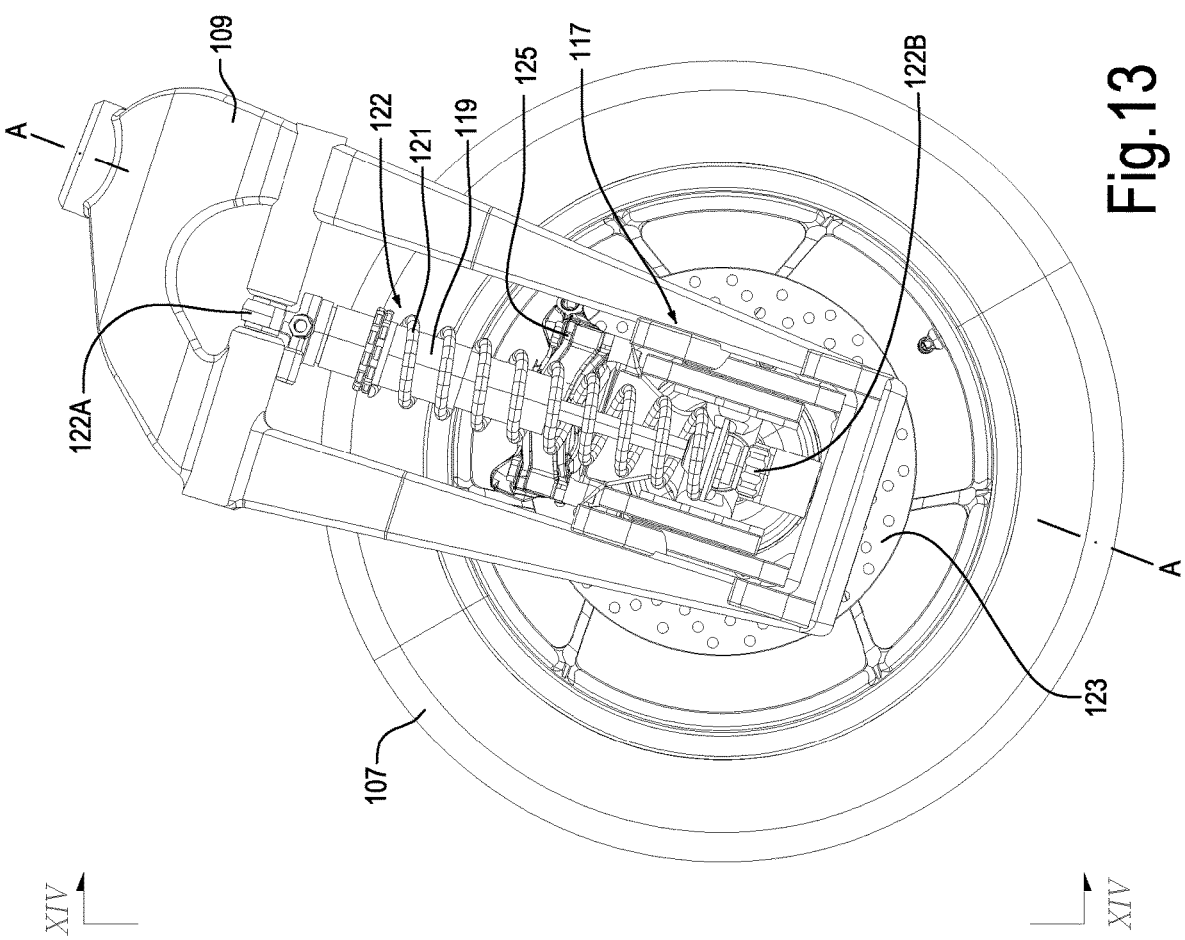
FIG. 13 shows a side view of a further embodiment of a front suspension along the line XIII-XIII of FIG. 14.

An embodiment of this type is shown in FIGS. 8, 9, 10, 11 and 12. In these figures, equal numbers indicate parts equal or equivalent to those already described with reference to FIGS. 1 to 7, and which will not be described again. The exploded view of FIG. 12 shows in particular the support element of the caliper 25 of the disc brake. The support member is indicated with 45. It may have a hole in which a bearing 47 is housed in which a rotation axle (not shown) of the front steered wheel 7, or an extension of such an axle, is inserted. The connecting rod 35 of the Tchebycheff four-bar linkage is also idly supported on the rotation axle of the front steered wheel 7.

The member 45 may be rigidly connected to one end 22B of the shock absorber 22. The interlocking constraint between the shock absorber 22 and the member 45 retains the caliper 25 against rotation around the rotation axis B-B of the front steered wheel 7 during braking. Since the connecting rod 35 and the support member 45 of the caliper 25 are idle with respect to each other, the connecting rod 35 and the member 45 can freely rotate with respect to each other around the rotation axis B-B. The pro-dive or anti-dive effect is very limited or negligible, since the member to which the caliper is rigidly connected in this case consists of the shock absorber 22, whose instance rotation center is placed very far, almost at the infinity.

The suspensions described above can be used in saddle-riding motor vehicles in the form of motorcycles, as schematically illustrated in FIGS. 1, 2 and 3, but can also adapt to use on other types of saddle-riding motor vehicles, for example on scooters.

In all the embodiments illustrated in FIGS. 1 to 12, the hinges connecting the cranks 31, 33 to the connecting rod 35 and to the rotatable arm 9 are arranged with their hinge axes parallel to each other and parallel to the rotation axis B-B of the front steered wheel 7. In this way, in essence, the Tchebycheff four-bar linkage formed by components 9, 31, 33, 35 lies on a plane orthogonal to the rotation axis B-B of the front steered wheel 7. The rotation axes of the revolute pairs of the Tchebycheff four-bar linkage are therefore oriented in a right-left direction, i.e. transverse with respect to a median plane of the motor vehicle 1.

Although this gives rise to a particularly efficient suspension, it is not the only possible embodiment of a four-bar linkage suspension which allows obtaining a substantially rectilinear trajectory of the rotation axis of the front steered wheel 7 during the suspension movement of the wheel itself, using a kinematic mechanism which includes only revolute pairs and no prismatic or cylindrical pair, that is, without members provided with a relative translation motion.

In other embodiments, it may be provided that the hinges that connect the members forming the Tchebycheff four-bar linkage to each other are arranged with their axes parallel to each other and oriented at 90° with respect to the rotation axis B-B of the front steered wheel 7, i.e. orthogonal to a plane containing this rotation axis B-B of the front steered wheel 7. In other words, the hinge axes of the revolute pairs which connect the components of the Tchebycheff four-bar linkage to each other are oriented so as to lie on vertical planes parallel to the median plane of the motor vehicle, i.e. on vertical planes extending in the direction of travel of the motor vehicle.

An embodiment of this type is illustrated in FIGS. 13 to 17. Parts corresponding to parts already described with reference to the previous figures are indicated with the same reference numerals increased by "100". In FIGS. 13 to 17 show only the front steered wheel 107 with the respective suspension 117 and the rotatable arm 109, while the motor vehicle, which may be a motor vehicle similar to that indicated with 1 in FIGS. 1 to 3, is not shown.

FIGS. 13 to 17 show the assembly comprising the front steered wheel 107, the rotatable arm 109 with its steering axis A-A, as well as the suspension 117 with all the components thereof. More particularly, in this embodiment a suspension 117 is provided, with a Tchebycheff four-bar linkage which comprises: the rotatable arm 109, a first crank 131, a second crank 133 and a connecting rod 135. In practice, each crank 131, 133 is double. The two parts of each crank are located outside the connecting rod 135, which is positioned centrally. The connecting rod 135 is also double and between the two components (visible in particular in the exploded view of FIG. 17) of the connecting rod 135 there is a wheel support 137, hinged centrally to the connecting rod 135 around an axis C-C. The hinge axis C-C joining the wheel support 137 and the connecting rod 135 intersects the rotation axis B-B of the front steered wheel and is orthogonal thereto.

The second crank 131 is hinged through a first hinge 131A to the rotatable arm 109 and through a second hinge 131B to the connecting rod 135. Likewise, the crank 133 is hinged through a first hinge 133A to the rotatable arm 109 and through a second hinge 133B to the connecting rod 135. The axes of the hinges 131A, 131B, 133A, 133B are parallel to each other and oriented at 90° with respect to the rotation axis B-B of the front steered wheel 107. The orientation direction of the axes of the hinges of the Tchebycheff four-bar linkage in this embodiment is parallel to the articulation axis C-C of the wheel support 137 to the connecting rod 135. In practice, the axes of the hinges of the Tchebycheff four-bar linkage are oriented orthogonally to a plane containing the rotation axis B-B of the front steered wheel 107 and substantially parallel to the direction of the suspension movement.

The dimensional ratios between the components of the Tchebycheff four-bar linkage are the same as defined above.

Figure 17:
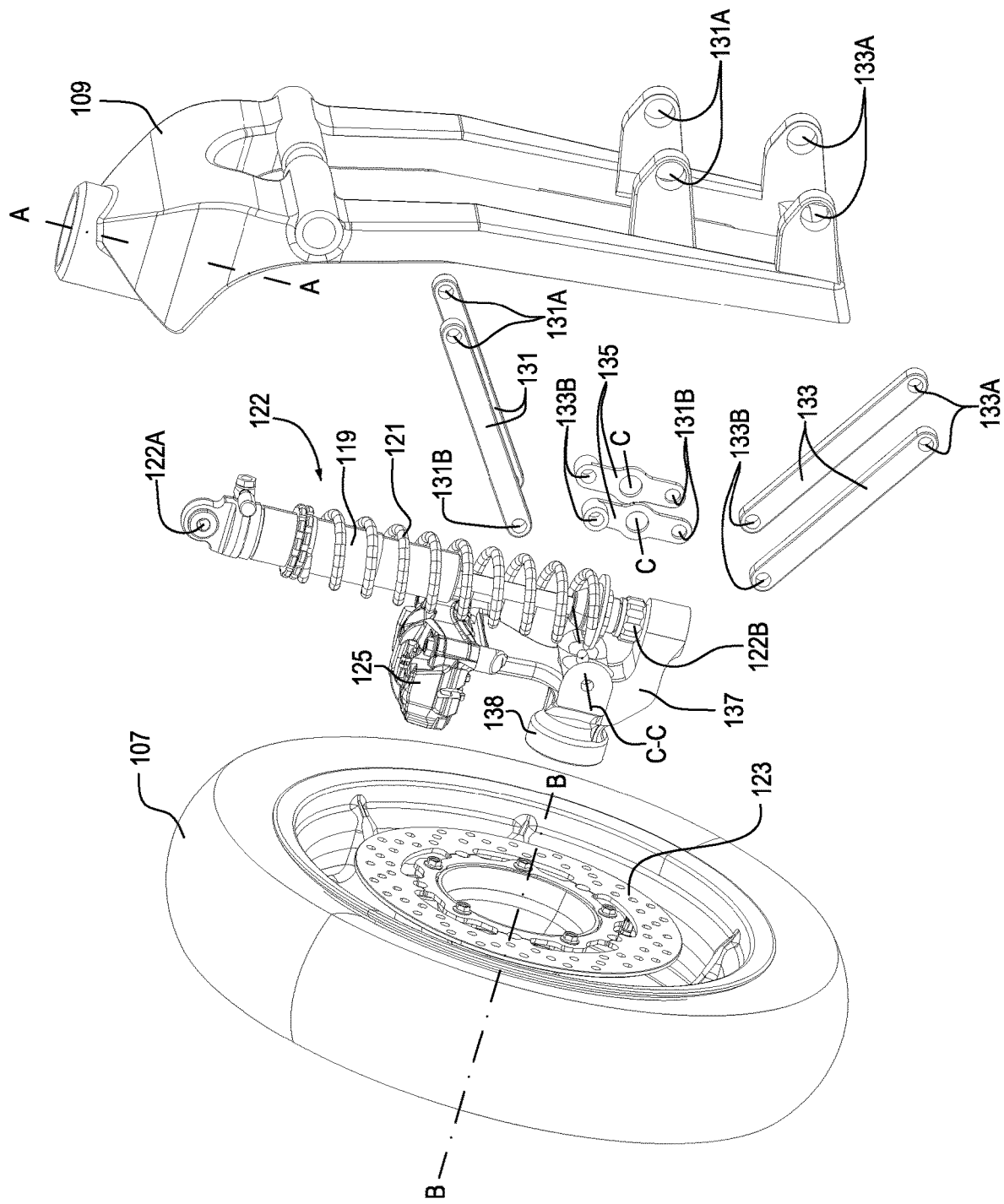
FIG. 17 shows an exploded view of the suspension of FIGS. 13, 14, 15 and 16.

In the illustrated embodiment, the wheel support 137 has a fork shape which embraces the connecting rod 135, as visible in particular in FIG. 17. The wheel support 137 may also have a connection constraint to the shock absorber 122. In the embodiment shown in FIGS. 13 to 17, the constraint between the wheel support 137 and the shock absorber 122 is an interlocking.

The wheel support 137 forms the rotation seat of the axle of the front steered wheel 107, not visible in the figures. For example, the wheel support 137 may have a housing 138 (FIG. 17) for a bearing in which the axle of the front steered wheel 107 is rotatably inserted. Alternatively, the wheel support 137 may be integral with a rotation axle on which the front steered wheel 107 is mounted by means of a bearing.

During the suspension movement of the front steered wheel 107, the four-bar linkage of the suspension 117 deforms with pivoting motion of the cranks 131, 133 with respect to the rotatable arm 109 and consequent pivoting motion of the connecting rod 135 about the hinge axis with which it is connected to the wheel support 137. The configuration of the Tchebycheff four-bar linkage formed by the components 109, 131, 133, 135 is also such that in the whole range of the suspension movement, the articulation between the connecting rod 135 and the wheel support 137, and therefore the articulation axis C-C, moves along an approximately rectilinear trajectory. Since the wheel support 137 is rigidly connected to the shock absorber 122, the pivoting motion of the connecting rod 135 has no effect on the camber angle of the front steered wheel 107.

Figure 18:
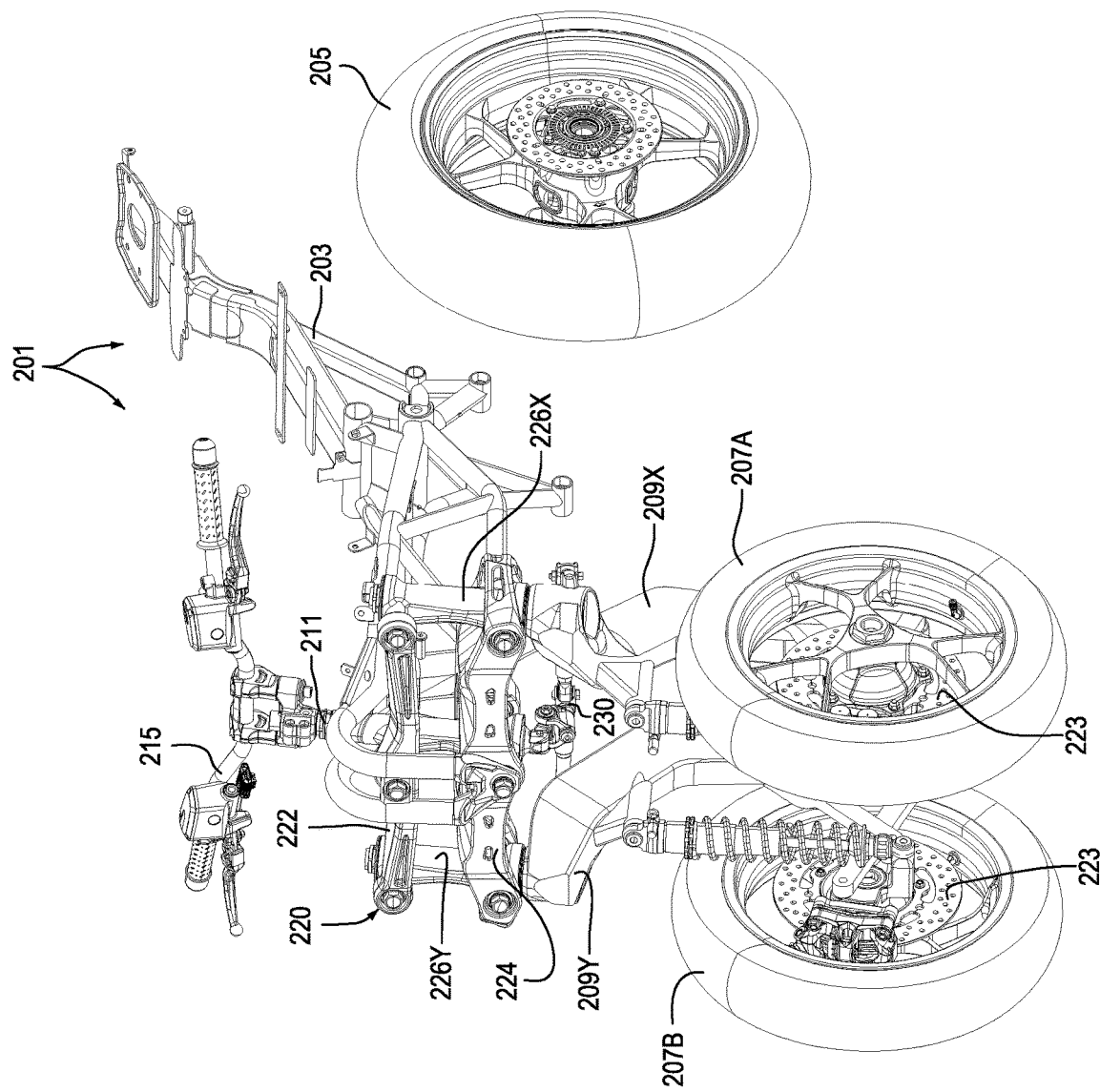
FIG. 18 shows an axonometric view of a three-wheel motor vehicle with double Tchebicheff four-bar linkage suspension for the two front steered wheels.
Figure 19:
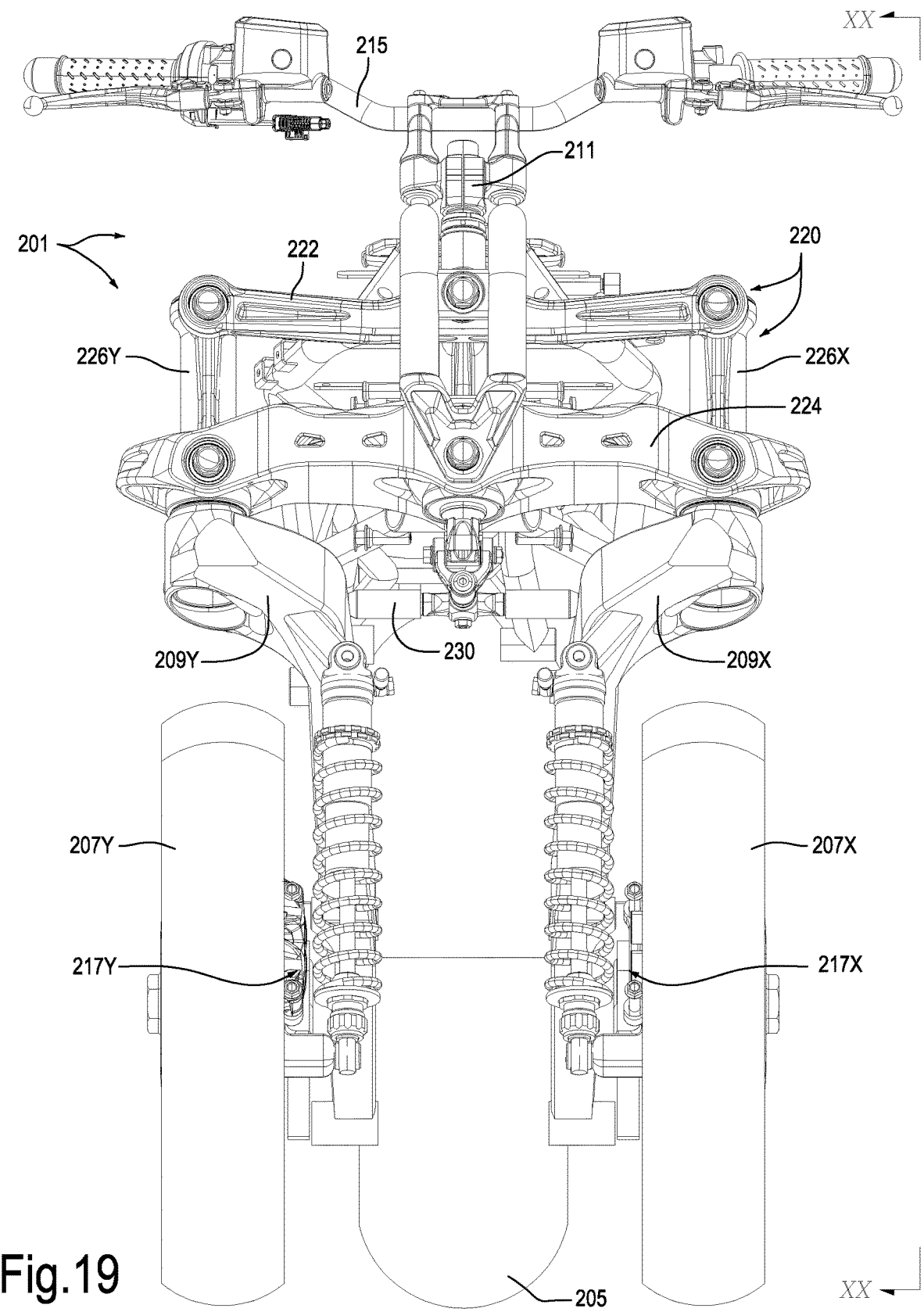
FIG. 19 shows a front view of the motor vehicle of FIG. 18 according to the line XIX-XIX of FIG. 20.
Figure 20:
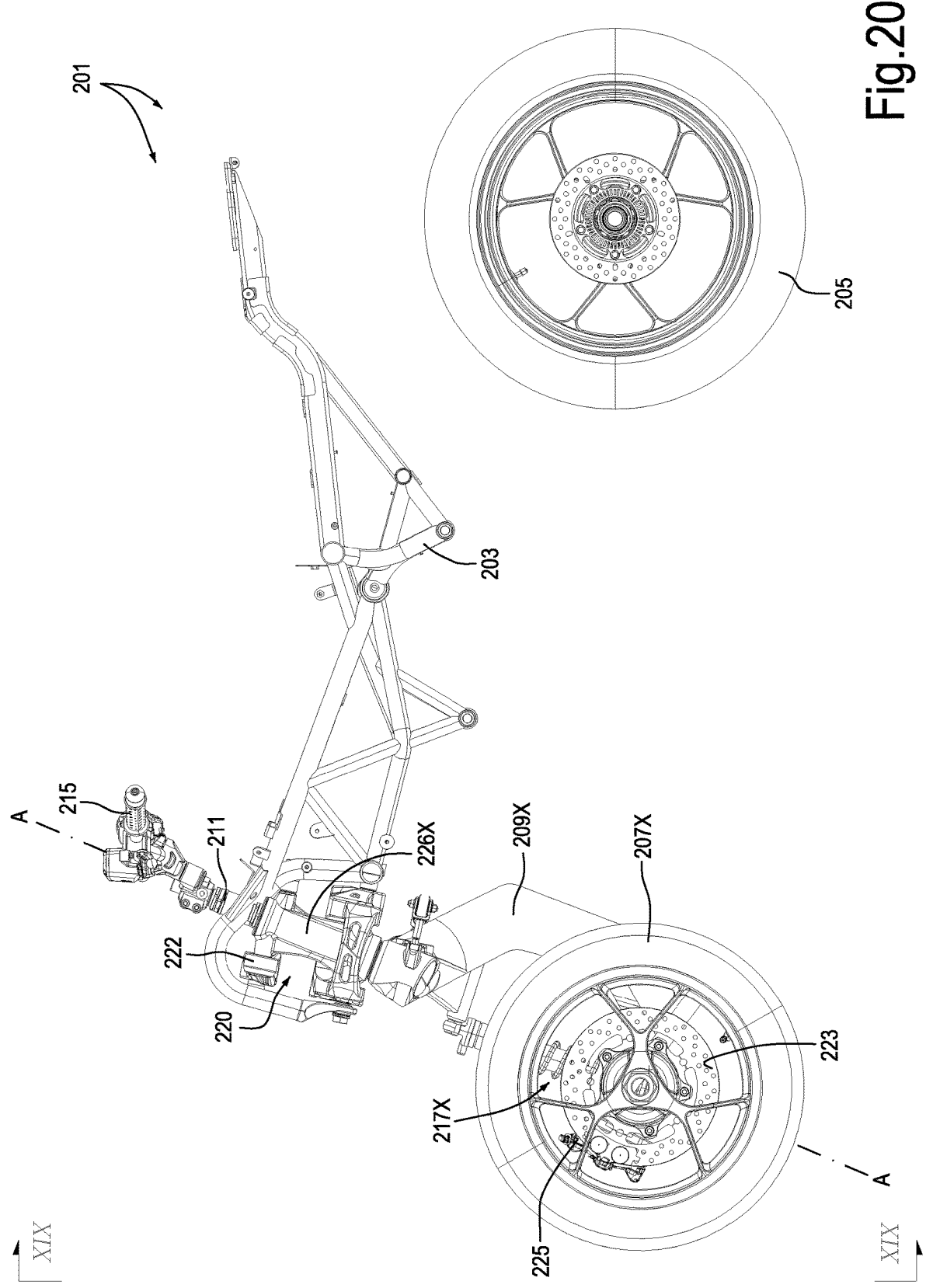
FIG. 20 shows a side view according to XX-XX of FIG. 19.

In the embodiments described so far, reference has been made to a two-wheel motor vehicle, with a single front steered wheel 7 or 107. However, the suspensions of the present description may also be used in tilting saddle vehicles with two front steered wheels, provided for example with one or two four-bar linkages able to ensure the rolling movement of the motor vehicle while driving. FIGS. 18, 19 and 20 schematically illustrate a tilting saddle motor vehicle 201 with frame 203, a rear driving wheel 205 and two respectively left and right front steered wheels 207X, 207Y. The two front steered wheels 207X, 207Y are alongside in a transverse direction, i.e. right-left, of the vehicle 201.

In the embodiment schematically illustrated in FIGS. 18, 19 and 20, reference numbers 209X and 209Y indicate two rotatable arms, having the same function as the single rotatable arm 9, 109 described with reference to the previous embodiments of motor vehicles with single front steered wheel. Each rotatable arm 209X, 209Y is adapted to rotate about a steering axis A-A.

For this purpose, each rotatable arm 209X, 209Y is rotatably housed in a support or upright 226X, 226Y which is part of a rolling four-bar linkage 220. The two supports or uprights 226X, 22Y are connected to each other by respectively upper and lower crosspieces 222 and 224. The crosspieces 222, 224 and the supports 226X, 226Y form the rolling four-bar linkage 220 and are hinged around hinge axes parallel to each other and lying in planes oriented in the forward-rear direction of the motor vehicle 201.

Reference numeral 215 indicates a handlebar, through which a steering movement is imparted around the axes A-A to the support arms 209X, 209Y by means of a steering column 211 which acts on a steering bar 230.

The rolling four-bar linkage described so far is known per se and does not require a more detailed description.

Each front steered wheel 207X, 207Y is connected to its own rotatable arm 209X, 209Y by means of a suspension 217X, 217Y, which may be made in any of the ways described with reference to FIGS. 1 to 17. In FIGS. 18, 19 and 20, the suspensions 217X, 217Y are configured as in FIGS. 1 to 7.

The invention claimed is:

1. A saddle-riding motor vehicle comprising:
   at least one rear driving wheel;
   at least a first front steered wheel;
   a rotatable arm, the front steered wheel being connected to the rotatable arm, which is provided with a rotary motion about a steering axis;
   a suspension comprising a shock absorber; and
   a wheel support connected to the rotatable arm with the interposition of the suspension, said wheel support supporting the front steered wheel and defining a rotation axis of said front steered wheel; wherein the suspension comprises a Tchebycheff (Chebyshev) four-bar linkage.

2. The motor vehicle of claim 1, wherein the Tchebycheff (Chebyshev) four-bar linkage comprises a first crank hinged with a first hinge to the rotatable arm and with a second hinge to a connecting rod of the Tchebycheff (Chebyshev) four-bar linkage; a second crank hinged with a first hinge to the rotatable arm and with a second hinge to the connecting rod; and wherein the wheel support is constrained in a constraining point of the connecting rod, such that the rotation axis of the front steered wheel is approximately equidistant from the second hinge of the first crank and from the second hinge of the second crank.

3. The motor vehicle of claim 2, wherein the first crank and the second crank intersect in any position of the suspension.

4. The motor vehicle of claim 2, wherein the wheel support is constrained to the connecting rod in such a way that the rotation axis of the front steered wheel is parallel to axes of the first hinge and of the second hinge of the first crank and of the second crank.

5. The motor vehicle of claim 4, wherein the wheel support is rigidly connected to the connecting rod and forms a housing for a bearing supporting the front steered wheel.

6. The motor vehicle of claim 2, wherein the first hinge and the second hinge of the first crank, and the first hinge and the second hinge of the second crank have axes substantially parallel to each other and orthogonal to a plane containing the rotation axis of the front steered wheel.

7. The motor vehicle of claim 6, wherein the wheel support is hinged to the connecting rod around an axis substantially parallel to the axes of the first hinge and of the second hinge of the first crank and of the second crank.

8. The motor vehicle of claim 7, wherein the wheel support supports the front steered wheel in such a position that the rotation axis of the front steered wheel is orthogonal to the axis around which the wheel support is hinged to the connecting rod.

9. The motor vehicle of claim 7, wherein the first hinges of the first crank and of the second crank are placed on a first side of the rotatable arm, and the second hinges of the first crank and of the second crank are placed on a second side of the rotatable arm, opposite to the first side, and wherein the connecting rod is placed on said second side.

10. The motor vehicle of claim 9, wherein the front steered wheel is on the second side of the rotatable arm, the connecting rod being positioned between the front steered wheel and the rotatable arm.

11. The motor vehicle of claim 1, comprising a disc brake, with a disc integral with the front steered wheel and a caliper, wherein said caliper is rigidly connected to the wheel support.

12. The motor vehicle of claim 1, further comprising a disc brake, with a disc integral with the front steered wheel and a caliper, wherein said caliper is rigidly connected to a support member mounted idle with respect to the connecting rod and to the wheel support, rotatable about the axis of rotation of the front steered wheel.

13. The motor vehicle of claim 2, wherein the shock absorber is connected on one side to the rotatable arm and on the other side to a point rigidly connected to the connecting rod or to one of the cranks of the Tchebycheff (Chebyshev) four-bar linkage.

14. The motor vehicle of claim 2, wherein the shock absorber is connected on one side to the rotatable arm and on the other side to a point rigidly connected to the wheel support.

15. The motor vehicle of claim 1, comprising a second front steered wheel, which is connected to a second rotatable arm provided with a rotary movement about a second steering axis and is connected, with the interposition of a second suspension, to a wheel support of the second front steered wheel; wherein the second suspension comprises a shock absorber and a Tchebycheff (Chebyshev) four-bar linkage, substantially symmetrical to the Tchebycheff (Chebyshev) four-bar linkage of the suspension of the first front steered wheel with respect to a median plane of the motor vehicle; and wherein the first front steered wheel and the second front steered wheel are connected to the frame of the motor vehicle by means of a rolling four-bar linkage hinged to the frame.

16. The motor vehicle of claim 15, wherein the first rotatable arm, to which the first front steered wheel is connected, and the second rotatable arm, to which the second front steered wheel is connected, are supported rotatably in respectively right and left uprights of the rolling four-bar linkage, the uprights being connected to each other by a first crosspiece and a second crosspiece, extending in right-left direction with respect to the median plane of the vehicle and hinged to the uprights.

* * * * *